Patented Jan. 19, 1926.

1,570,529

UNITED STATES PATENT OFFICE.

EINAR VIGGO SCHOU, OF PALSGAARD, NEAR JUELSMINDE, DENMARK.

MANUFACTURE OF MARGARINE AND EDIBLE FATS.

No Drawing.   Application filed October 14, 1921. Serial No. 507,689.

*To all whom it may concern:*

Be it known that I, EINAR VIGGO SCHOU, civil engineer, a subject of the King of Denmark, residing at Palsgaard, near Juelsminde, in the Kingdom of Denmark, have invented certain new and useful Improvements in or Relating to the Manufacture of Margarine and Edible Fats, of which the following is a specification.

This invention relates to the manufacture of margarine and edible fats.

It is well known that margarine manufactured wholly or partly from vegetable fats, such as cocoanut oil or palmkernel oil or the like, is not as tough and pliable as butter and being more susceptible than butter to the influence of high or low temperatures, it becomes much softer at the former and harder and more brittle at the latter than is the case with butter.

According to one feature of the present invention margarine is produced without these defects, and in other respects superior to ordinary margarine by adding to margarine made wholly or partly from vegetable fats, either during the process of manufacture, or to the otherwise finished margarine, a small proportion of an emulsion which is soluble in oil and in which the watery portion thereof is uniformly distributed throughout and finely divided within the oily portion, that is to say, an emulsion in which the oil or oily material constitutes the external phase and the watery portion the internal phase.

The process of manufacturing an emulsion which possesses these novel and special characteristics is described in and forms the subject of my co-pending application Serial No. 507,690, filed October 14, 1921 and as therein stated oleaginous materials having tough and elastic properties and possessing a high degree of viscosity are suitable for the production of emulsions of this kind. Such oleaginous emulsifying materials may be produced, as described in my co-pending patent application, either by adding to edible oils suitable substances which possess in a high degree, tough and elastic properties, or by subjecting edible oils to a suitable treatment, chemical or physical or both, whereby the oils attain the desired consistency and viscosity.

Although the preparation of these oleaginous materials does not form part of the present invention, which only refers to their particular use in the manufacture of margarine or edible fats, the following is given by way of example as a suitable method of preparing the same:—

100 parts of refined soya oil are heated to a temperature of 250° centigrade and while the oil is being constantly stirred heated air is blown therethrough, the temperature being maintained until gelatination sets in. The duration of the process depends upon the quantity and the temperature of the air used. The products of decomposition, in particular free fatty acids, if any, are carried away by the distilling effect caused by the high temperature of the process.

As soon as gelatination sets in, the air blast is stopped. The gelatinated oil is then cooled down approximately to 100° centigrade, and there is now added about 300 parts of fresh oil of a suitable kind such as for example, cotton seed oil, groundnut oil or sesame oil. The stirring of the blend is continued at a temperature of from 100° to 120° centigrade, until the gelatinated oil is completely dissolved in the fresh oil, after which the blend is cooled down to ordinary temperature, and the oleaginous emulsifying material, which is of a viscous, tough and elastic character is ready for use in preparing the emulsion.

Good results have been obtained with the process carried out in the manner described, but I do not confine myself to this example only, and the process may be varied in accordance with the materials used.

From the aforesaid viscous, tough and elastic oil and emulsion may be prepared which is soluble in oil and which contains 75% or more of water, the water being distributed uniformly and in a state of minute division throughout the oil, each water globule being surrounded by a film of oil.

The following may serve as an example of one method of preparing the said emulsion:—

To 100 parts of the oleaginous emulsifying material there is added gradually and while being vigorously stirred, 300 parts or thereabout of pure water or a watery solution of suitable materials. The addition may conveniently be made at the rate of about one part of the watery material to about 12 parts of the oily material per minute.

In emulsions prepared in this manner it is possible to obtain directly only through the dispersing force of the oil and without further treatment, a very minute division of the watery globules say from 1 µ to 5 µ or less. The division is so fine that the Brown movement of the watery globules is distinctly visible under the microscope.

The emulsion, being soluble in oil, may be easily blended with the margarine or with the fats of the same in any suitable apparatus such as a blender, and when thus blended, the watery portion of the emulsion forms an integral part of the margarine and cannot be separated therefrom by mechanical means. The addition of a suitable proportion of the emulsion not only improves the consistency of the margarine but it has also a very marked effect on its frying properties.

As is the case with butter, but unlike ordinary margarine, margarine prepared in this manner does not sputter in the pan, it emits a fine uniform froth, and after evaporation of the water, the milk solids, salt or the like, are present in a finely divided state and do not adhere to the pan. For the purpose of giving ordinary margarine these frying properties, it has been proposed to add to margarine the yolks of eggs, cream or the like. The effect of these additions is not only less marked than in the case of margarine prepared according to the present invention, but the process is costly and the keeping qualities of the margarine are somewhat impaired by these additions, as owing to the ingredients being of a fermentable nature and forming emulsions with the watery portion of the margarine, undesirable fermentations are apt to set in.

According to a further feature of the present invention fermentable ingredients may be added to the watery portion of the emulsion which is added to the margarine without danger of any undesirable fermentation occurring, as the oily film which surrounds the water globules in the emulsion forms an effective protection against that portion of the water, which has been brought into the margarine through the emulsion, getting into contact with the other water contained in the margarine so that the one portion cannot therefore affect the other. To this end, therefore, and before emulsification there may be added to the watery portion of the emulsion, which may consist of water and milk or a blend of both or the like, such fermentable ingredients as sugar, glucose or the like and especially those containing vitamines, either in solution or in a state of fine suspension or emulsion.

When separated milk is used as the watery portion of the emulsion, the frothing properties of the margarine when used for frying, are increased by dissolving a small proportion of salt in the milk before emulsification.

According to another feature of the present invention the viscous, tough and elastic oil may also, without emulsification and in a suitable small proportion, be added to margarine, either during the process of manufacture, or else to the otherwise finished product, thereby increasing the viscosity of the margarine and making it of similar or greater viscosity than butter without appreciably altering the melting point of the margarine.

Margarine as at present manufactured is not suitable for baking purposes, owing to the fact that it contains an appreciable proportion of vegetable fats and on account of the low viscosity of these fats, the margarine, contrary to butter, is apt to escape from the pastry during the process of baking. This is obviated by the present process, as by the addition of the viscous tough and elastic oil in the manner described, the degree of viscosity of the fats may be exactly regulated without thereby appreciably altering the melting point of the margarine. For baking purposes it is advisable to give the margarine a higher degree of viscosity than when it is intended to be used for ordinary purposes and care must also be taken to keep the percentage of water in the finished margarine rather low.

Edible fats whether in solid, semi-solid or liquid form, are also largely used for baking purposes or the like, and when vegetable fats or oils are used in their composition, it is of advantage to raise the viscosity of the edible fat by the addition of a suitable proportion of the thick, sticky and viscous oil in the manner described.

The following may serve as an example of one method of carrying out the present process:—

To 25 parts of an oil of a high degree of viscosity there is gradually added in a blending machine and while vigorously stirring the same 75 parts of separated milk or water or a mixture of both, with or without the addition of suitable ingredients which are soluble in water, or which are in a state of suspension or emulsion, such for example as sugar, glucose, ingredients containing vitamines, salt or the like. The emulsion thus formed, if properly prepared, is very thick and the watery portion is finely divided in the oily portion, each water globule being surrounded by a film of oil. To 100 parts of the emulsion which is thus prepared is now added collectively and while being slowly stirred, 25 parts of any suitable oil or melted fat, care being taken that the emulsion is completely dissolved in the oil or fat. In an emulsion prepared in this manner the size of the water globules may be reduced to 1 µ to 2 µ or less. Of this emulsion 5 to 15 parts are added to 100 parts of margarine either directly to the fats or in the churn or emulsifying machine. The addition may also conveniently be made in a blending machine to the otherwise finished margarine, care being taken that the emulsion is uniformly distributed in the whole mass.

Another way to proceed is as follows:—

To 100 parts of vegetable fats, such as cocoanut oil or the like, there is added, either during the process of manufacture or to the otherwise finished margarine, from 5 to 15 parts of the viscous, tough and elastic oil, the exact proportion being regulated so as to get in the margarine as nearly as possible the same degree of viscosity as in butterfat or rather more when the margine is being prepared for baking purposes. When the viscous tough and elastic oil is added to the fats care must be taken that the oil is completely dissolved in the fats. The fats when thus prepared are manufactured into margarine in the ordinary way. If desired a portion of the viscous oil may be added directly to the fats, the remaining portion being in the form of an emulsion prepared as described.

Instead of the 5 to 15 parts of the viscous, tough and elastic oil it may be broadly stated that substantially 10 parts of the elastic oil is employed and which is sufficiently broad to include any percentage of the elastic oil included within 5 to 15 percent.

In the case of edible fats the process is the same as above described, the proportions of the emulsion or of the viscous, tough and elastic oil being regulated according to the use which is to be made of the finished product, which may be either in a solid, semi-solid or liquid state.

By the use of the limitation "an oily constituent" it is intended to mean an oily or fatty matter being fluid at normal temperatures or being normally solid but made oily by heating.

Margarine and edible fats being a composition of a watery constituent or watery portion such as milk, watery solutions, pure water or the like on the one hand and an oily constituent or oily portion such as fats or melted fats, edible oils or the like on the other hand, I have in the following claims covered both margarine and edible fats by the common expression edible compositions of an oily and a watery constituent.

Having now particularly described and ascertained the nature of my said invention and in what manner the same is to be performed, I declare that what I claim is:—

1. A process for the manufacture of edible compositions of the kind referred to which comprises dissolving an oil soluble water dispersing medium derived from fatty oils in an oily constituent, and distributing the watery constituent in the oily or fatty constituent until a state of permanent dispersion is reached.

2. A process for the manufacture of edible compositions of the kind referred to which comprises dissolving an oil soluble water dispersing medium derived from fatty oils in a part of the oily constituent, and diluting the emulsion with another part of the oily constituent.

3. A process for the manufacture of edible compositions of the kind referred to which comprises dissolving an oil soluble water dispersing medium derived from fatty oils in a part of the oily constituent, emulsifying a part of the watery constituent into the oily constituent, and blending the oil soluble stable emulsion with other parts of the oily and watery constituents.

4. Edible compositions of the kind referred to in which the oily constituent containing an oil soluble water dispersing medium derived from fatty oils forms the outer phase and the watery constituent the inner phase of a stable emulsion.

5. Edible compositions of the kind referred to in which a part of the oily portion containing an oil soluble water dispersing medium derived from fatty oils forms the outer phase and the watery portion the inner phase of a stable emulsion blended with the other part of the oily portion.

6. Edible compositions of the kind referred to in which a part of the oily portion containing an oil soluble water dispersing medium derived from fatty oils forms the outer phase and a part of the watery portion the inner phase of a stable emulsion blended with the other parts of the oily and watery portions.

7. Edible compositions of the kind referred to in which a part of the oily portion containing an oil soluble water dispersing medium derived from fatty oils forms the outer phase and a part of the watery portion the inner phase of a stable emulsion blended with the other parts of the oily and watery portions, suitable substances being dissolved in the watery portion forming the inner phase of the emulsion.

8. A process for the manufacture of fat compositions which comprises gelatinizing 100° of soya oil, dissolving said gelatinated oil in 300 parts of a vegetable oil, emulsifying the oil-dissolved gelatinized oil and blending the emulsion with margarine in the proportions of substantially 10 parts of emulsion to 100 parts of margarine.

9. A process for the manufacture of fat compositions which comprises gelatinizing 100° of soya oil, dissolving said gelatinated oil in 300 parts of a vegetable oil, emulsifying the oil-dissolved gelatinized oil and then blending the emulsion with margarine in the proportions of substantially 10 parts of the emulsion to 100 parts of margarine.

10. A margarine comprising a mixture of vegetable fats and an emulsifying oil-soluble gelatinized oil.

In testimony whereof I affix my signature.

EINAR VIGGO SCHOU.